US010931635B2

(12) United States Patent
Rhee et al.

(10) Patent No.: US 10,931,635 B2
(45) Date of Patent: Feb. 23, 2021

(54) HOST BEHAVIOR AND NETWORK ANALYTICS BASED AUTOMOTIVE SECURE GATEWAY

(71) Applicants: NEC Laboratories America, Inc., Princeton, NJ (US); NEC Corporation, Tokyo (JP)

(72) Inventors: Junghwan Rhee, Princeton, NJ (US); Hongyu Li, North Brunswick, NJ (US); Shuai Hao, Newark, DE (US); Chung Hwan Kim, Pennington, NJ (US); Zhenyu Wu, Plainsboro, NJ (US); Zhichun Li, Princeton, NJ (US); Kangkook Jee, Princeton, NJ (US); Lauri Korts-Parn, Tokyo (JP)

(73) Assignee: NEC CORPORATION

( * ) Notice: Subject to any disclaimer, the term of this patent is extended or adjusted under 35 U.S.C. 154(b) by 272 days.

(21) Appl. No.: 16/146,166

(22) Filed: Sep. 28, 2018

(65) Prior Publication Data
US 2019/0104108 A1    Apr. 4, 2019

Related U.S. Application Data

(60) Provisional application No. 62/565,486, filed on Sep. 29, 2017, provisional application No. 62/660,319, filed on Apr. 20, 2018.

(51) Int. Cl.
*H04L 29/06* (2006.01)
*G06N 20/00* (2019.01)
(Continued)

(52) U.S. Cl.
CPC ...... *H04L 63/0209* (2013.01); *H04L 63/1416* (2013.01); *H04L 63/1425* (2013.01);
(Continued)

(58) Field of Classification Search
CPC ............ H04L 63/0209; H04L 63/1416; H04L 63/1425; H04L 63/0428; H04L 67/12;
(Continued)

(56) References Cited

U.S. PATENT DOCUMENTS 9,483,644 B1 * 11/2016 Paithane ............... G06F 21/566
9,756,061 B1 *  9/2017 Roeh .................. H04L 63/1425
(Continued)

OTHER PUBLICATIONS

Matvei KAlex Oyler, "Security in Automotive telematics: a survey of threats and risk mitigation strategies to counter the existing and emerging attack vectors," pp. 1-10, 2016 (Year: 2016).*
(Continued)

*Primary Examiner* — Luu T Pham
*Assistant Examiner* — Canh Le
(74) *Attorney, Agent, or Firm* — Joseph Kolodka

(57) ABSTRACT

Systems and methods for an automotive security gateway include an in-gateway security system that monitors local host behaviors in vehicle devices to identify anomalous local host behaviors using a blueprint model trained to recognize secure local host behaviors. An out-of-gateway security system monitors network traffic across remote hosts, local devices, hotspot network, and in-car network to identify anomalous behaviors using deep packet inspection to inspect packets of the network. A threat mitigation system issues threat mitigation instructions corresponding to the identified anomalous local host behaviors and the anomalous remote host behaviors to secure the vehicle devices by removing the identified anomalous local host behaviors and the anomalous remote host behaviors. Automotive security gateway services and vehicle electronic control units operate the vehicle devices according to the threat mitigation instructions.

19 Claims, 6 Drawing Sheets

(51) Int. Cl.
  *H04W 4/44* (2018.01)
  *H04W 4/40* (2018.01)
  *H04W 4/48* (2018.01)
  *H04L 29/08* (2006.01)

(52) U.S. Cl.
  CPC .......... *G06N 20/00* (2019.01); *H04L 63/0236* (2013.01); *H04L 63/0428* (2013.01); *H04L 67/12* (2013.01); *H04W 4/40* (2018.02); *H04W 4/44* (2018.02); *H04W 4/48* (2018.02)

(58) Field of Classification Search
  CPC ...... H04L 63/0236; H04W 4/44; H04W 4/40; H04W 4/48; G06N 63/0236
  See application file for complete search history.

(56) References Cited

U.S. PATENT DOCUMENTS

| | | |
|---|---|---|
| 2011/0144858 A1 | 6/2011 | Yun et al. |
| 2011/0160951 A1* | 6/2011 | Ishigooka ................ G07C 3/02 701/31.4 |
| 2012/0136526 A1* | 5/2012 | Kusano .................. G07C 5/085 701/29.2 |
| 2014/0250530 A1* | 9/2014 | Moeller .................. H04L 67/12 726/23 |
| 2016/0021127 A1* | 1/2016 | Yan ....................... H04W 12/08 726/23 |
| 2016/0381068 A1 | 12/2016 | Galula et al. |
| 2017/0013005 A1 | 1/2017 | Galula et al. |
| 2017/0093866 A1* | 3/2017 | Ben-Noon ............. H04L 67/12 |
| 2018/0241720 A1* | 8/2018 | Healy .................... H04L 47/31 |
| 2019/0182267 A1* | 6/2019 | Aher ................. H04W 12/1204 |

OTHER PUBLICATIONS

Yaping JIang, et al. "A Model of Instruction Prevention Based on Immune," IEEE Computer Society, 2009, pp. 441-444. (Year: 2009).*

* cited by examiner

HOST BEHAVIOR AND NETWORK ANALYTICS BASED AUTOMOTIVE SECURE GATEWAY

RELATED APPLICATION INFORMATION

This application claims priority to U.S. Provisional Application No. 62/565,486, filed on Sep. 29, 2018, incorporated herein by reference herein its entirety.

BACKGROUND

Technical Field

The present invention relates to gateway security of a network hub and more particularly to host behavior and network analytics based automotive security gateway.

Description of the Related Art

Automotive vehicles become progressively more advanced as technology in general, and automotive technology in particular, advances. Systems and devices for various sensor tasks, safety systems, autonomous driving systems, infotainment devices, networking systems and other systems are being continuously added and improved upon. As a result, computing systems in the vehicle or in communication with vehicle systems become increasingly complex. As complexity increases, so does the risk of attack and the variety of attack vectors that can risk the privacy, security and safety of vehicle occupants, as well as the integrity of vehicle operations in general.

SUMMARY

According to an aspect of the present principles, a system is provided for an automotive security gateway. The system includes an in-gateway security system that monitors local host behaviors in vehicle devices to identify anomalous local host behaviors using a blueprint model trained to recognize benign behaviors. An out-of-gateway security system monitors network traffic across remote hosts, local devices, hotspot network, and in-car network to identify anomalous behaviors using deep packet inspection to inspect packets of the network traffic. A threat mitigation system issues instructions corresponding to the identified anomalous behaviors of local host and remote host to secure the vehicle devices by removing the identified anomalous behaviors. Automotive security gateway services and vehicle electronic control units operate the vehicle devices according to the threat mitigation instructions.

According to another aspect of the present principles, a system is provided for an automotive security gateway. The system includes an in-gateway security system that monitors local host behaviors in vehicle devices to identify anomalous behaviors, the in-gateway security system including a system scanner that scans each of the vehicle devices to identify in-gateway services and a blueprint modelling system trained to recognize benign local host behaviors. An out-of-gateway security system monitors network traffic across remote hosts, local devices, hotspot network, and in-car network to identify anomalous behaviors, the out-of-gateway security system including a network screen that scans the network traffic to identify out-of-gateway services and a deep packet inspector use deep packet inspection to inspect packets of the network traffic to identify packet attributes including a packet source address and a packet destination address. A threat mitigation system issues threat mitigation instructions corresponding to the identified anomalous local host behaviors and the anomalous remote host behaviors to secure the vehicle devices by removing the identified anomalous local host behaviors and the anomalous remote host behaviors. Automotive security gateway services and vehicle electronic control units operate the vehicle devices according to the threat mitigation instructions.

According to another aspect of the present principles, a method is provided for securing an automotive security gateway. The method includes monitoring local host behaviors in vehicle devices with an in-gateway security system to identify anomalous local host behaviors using a blueprint model trained to recognize secure local host behaviors. Network traffic is monitored across remote hosts, local devices, hotspot network, and in-car network to identify anomalous behaviors using deep packet inspection to inspect packets of the network traffic. Threat mitigation instructions are issued corresponding to the identified anomalous local host behaviors and the anomalous remote host behaviors a threat mitigation system to secure the vehicle devices by removing the identified anomalous local host behaviors and the anomalous remote host behaviors. The vehicle devices are operated using automotive security gateway services and electronic control units of a vehicle according to the threat mitigation instructions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
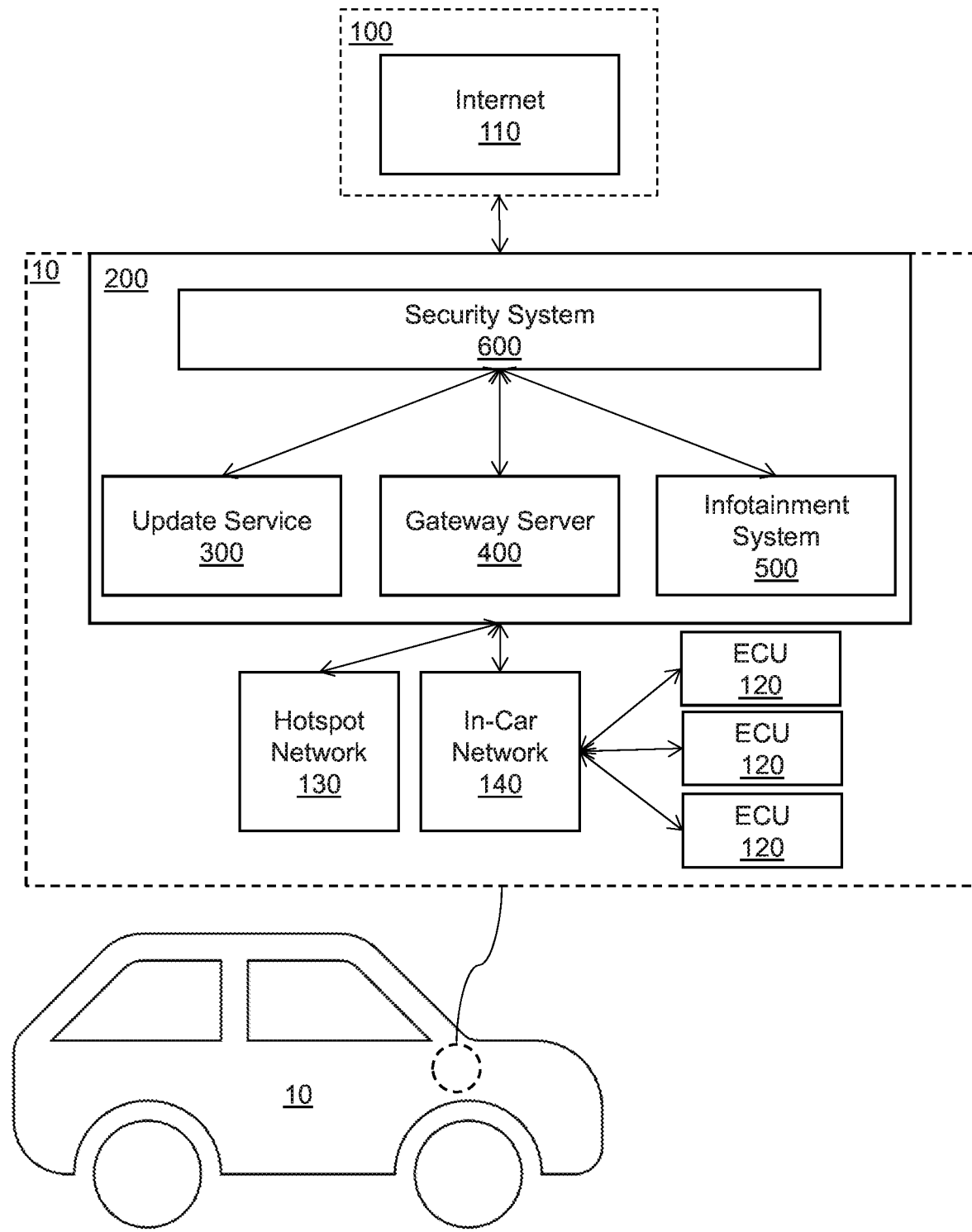
FIG. 1 is a block/flow diagram illustrating a high-level system/method for a host behavior and network analytics based automotive security gateway, in accordance with the present principles.

In accordance with the present principles, systems and methods are provided for host behavior and network analytics in an automotive security gateway.

In one embodiment, an automotive gateway is provided with a security system for monitoring both operating system events within the gateway, as well as network traffic from out of the gateway. The security system monitors event activity from each of the in-gateway services to determine if a program includes a process, file or network threat to the vehicle or system.

However, because every specific event that poses a threat cannot be known, the automotive security gateway includes a blueprint model that learns normal runtime behavior of each component of the in-gateway system. The blueprint model can include, e.g. a whitelist of network behaviors, file behaviors, and process behaviors. As operating system events take place, the blueprint model learns normal runtime events. Thus, when an event is discovered that is not part of the normal runtime events, the security system can identify the event as anomalous. As a result, the security system issues an alarm against the event. The security system can also verify each runtime program hash with a hash of a corresponding original program. If the hash is modified, the integrity is compromised, and an alarm is issued. Similarly, the security system can issue an alarm when a program is not one of a set of live programs and when the program is unencrypted. Thus, security can be ensured by protecting against anomalous programs and events occurring within the gateway.

The security system also monitors network traffic from out-of-gateway devices, such as, e.g., a vehicle electronic control unit (ECU), an in-vehicle Wi-Fi hotspot network, or other in-car network and out of car network including an update service. To do so, the security system analyzes packets in the network traffic to determine if, e.g., signatures in the packet are whitelisted or blacklisted, whether encryption is used, whether the traffic content is of a known type, and whether the network or destination and source addresses are whitelisted. To determine the whitelisting, a blueprint model can be trained, similar to the model described above, or a discrete list can be used. If out-of-gateway network traffic is determined to be a threat, an alarm is raised. Thus, security can be ensured by protecting against anomalous network traffic coming from outside of the gateway.

As a result, the security system can monitor both in-gateway and out-of-gateway activity concurrently to protect the vehicle systems from attack from both sides. Thus, security of increasingly complex, sophisticated and connected vehicle systems can be protected despite similarly increasingly sophisticated and complex attacks and attack vectors.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for a host behavior and network analytics based automotive security gateway is illustratively depicted in accordance with one embodiment of the present principles.

In one embodiment, a vehicle 10 includes an automotive security gateway 200. The automotive security gateway 200 provides a hub for networks in the vehicle 10 and systems for vehicle functionalities. Accordingly, the automotive security gateway 200 includes a gateway for local host services. However, some of the local host services can present security risks to the vehicle 10. For example, attacks can be made against vehicle 10 systems and functionalities that can hamper, e.g., vehicle 10 safety systems such as, airbag operations, automated driving functions, anti-lock braking system (ABS), traction control, stability control, and other safety systems, as well was vehicle 10 operations, such as, e.g., steering, throttle, braking, among others.

The attacks can come in the form of, e.g., corruptions to files, trojan horse attacks, viruses, or any other attack that can spread through the local host devices and services. Therefore, the automotive security gateway 200 can be used to protect against such attacks by, e.g., monitoring each host device for anomalous processes. For example, the automotive security gateway 200 includes local host devices for providing the local host services, including, e.g., a gateway server 400, an infotainment system 500, an update service 300, and any other host devices for providing local host services to the vehicle.

To secure each of the host devices 300, 400 and 500, events, such as operating system (OS) events at each of the host devices 300, 400 and 500 can be monitored for anomalies. Thus, the automotive security gateway 200 can include a security system 600 to monitor operations of each of the updated network 300, the gateway server 400 and the infotainment system 500, among any other local host devices providing vehicle functionalities.

While monitoring, the security system 600 can test OS events against criteria for secure operation. The criteria include information for making determinations of secure events and attack threat events. Thus, the security system 600 can include security testing criteria that includes, e.g., a whitelist of safe events, a blacklist of unsafe or unknown events, a blueprint modelling system including, e.g., a processor to execute a model stored in a temporary or permanent memory, to learn safe or anomalous events, thresholds for change of event properties, and any combinations thereof. For example, when monitoring files, processes and network activities of a local host device program, a blueprint modelling system can be employed that has been trained to recognize safe events. Thus, when a file, process or network activity occurs within the automotive security gateway 200 that is different from the safe event trained blueprint modelling system, the blueprint modelling system identifies the file, process or network activity as anomalous, and thus a potential threat to the vehicle and to occupants of the vehicle.

However, some functionalities of the vehicle 10 are provided from outside of the automotive security gateway 200, such as, e.g., software updates, internet connections, device-to-vehicle connections, and other out-of-gateway services. The out-of-gateway functionalities include devices and services that are not secured within the automotive security gateway 200 due to the external origination. As a result, the out-of-gateway services can also provide possible attack vectors to vehicle systems by communicating threats via network communications.

For example, a network or device connected to a network can attack vulnerabilities in various systems from the outside-in. Such out-of-gateway services can include any route of communication such as, e.g., a wireless link for internet 110 and software updates. Thus, the out-of-gateway services 100 can present a risk to the security of the vehicle 10.

The hotspot network 130 can include a Wi-Fi network formed by the vehicle 10 with which external devices, such as, e.g., personal computers, smartphones, tablets, laptops, and any other Wi-Fi enabled device, can communicate. Such a connection can be a medium through which an attack can be made. This hotspot network 130 is not verifiably secure. Thus, the hotspot network 130, should the vehicle 10 connect to it, could provide another medium in which an attacker can attack the vehicle 10. In-Car network 140 is the network connecting to internal car devices and ECUs 120. ECUs represent Electronic Control Units which are embedded systems to control electrical systems in a car.

To guard against such out-of-gateway threats, the security system 600 can monitor network traffic across multiple networks such as the hotspot network 130, the in-car network 140, and out of the automotive security gateway. Thus, when there is traffic across multiple networks and the automotive security gateway 200, the security system 600 monitors that traffic by, e.g., inspecting packets, or by other inspection techniques, to verify that the traffic is secure due to, e.g., the use of encryption, a trusted source address or destination address, a trusted content type, among other possible indications of security.

The automotive security gateway 200 can respond to threats to the security and integrity of automotive systems and functionalities. Once an event or packet is identified as anomalous, the security system 600 can issue an alarm for the anomalous event or packet. The alarm can include, e.g., an auditory or visual alarm through in car systems such as, e.g., the infotainment system 500 for the user to receive, or a log on the gateway server 400 for diagnosis by a user or maintenance professional, or even an automated response to safely bring the vehicle 10 to a stop by, e.g., controlling the ECU 120 to adjust throttle, steering and braking. In addition to the alarm, the security system 600 can also, e.g., terminate the anomalous event or packet, isolate and quarantine associated files and processes, disconnect devices originating the anomalous even or packet, or take other actions to ensure the security and integrity of the vehicle 10. Thus, the vehicle 10 and the automotive security gateway 200 can identify threats from both internal and external systems and functionalities, thus providing security to both sides of the automotive security gateway 200. As a result, security and integrity is provided to the vehicle 10, even for sophisticated and networked vehicles.

Figure 2:
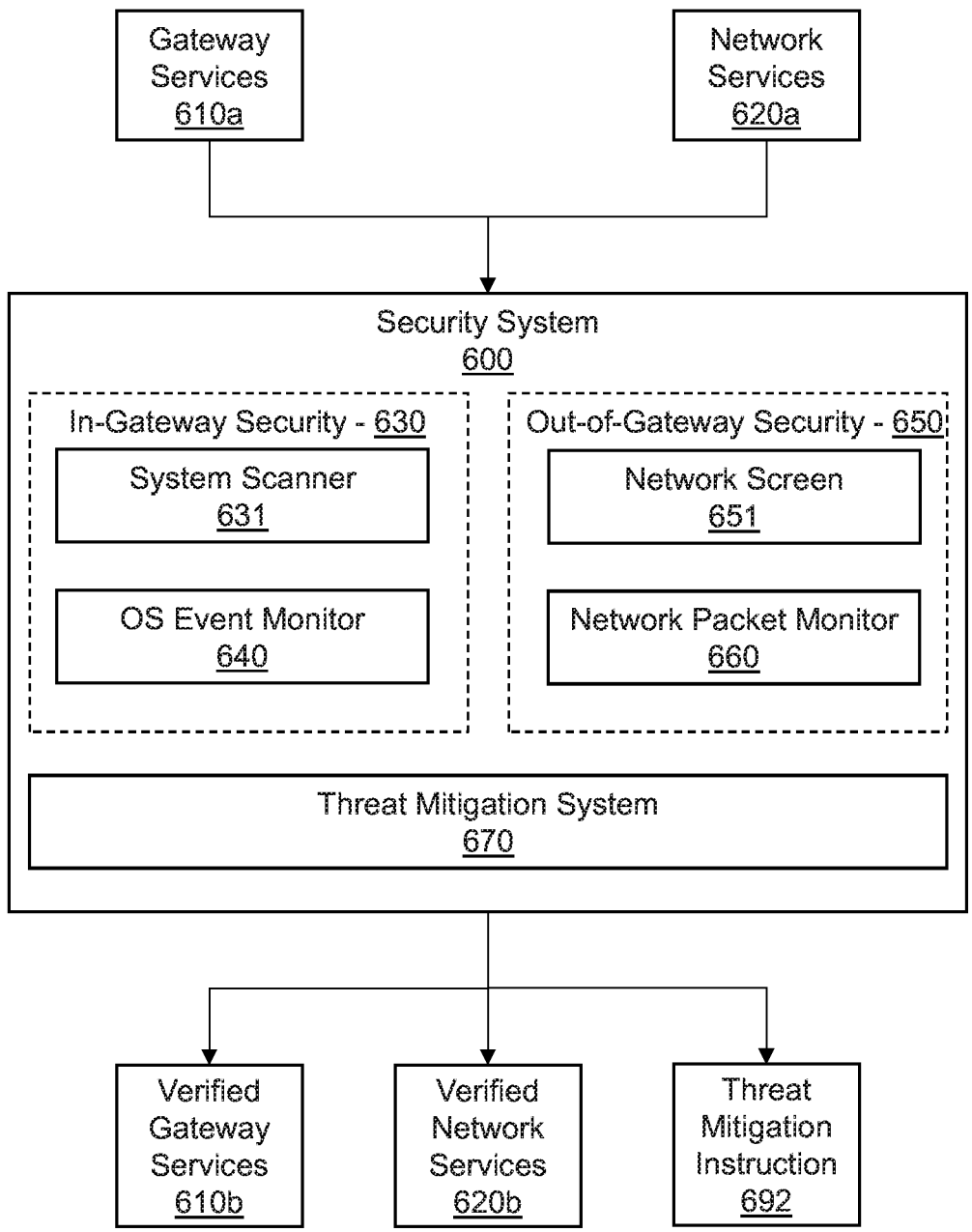
FIG. 2 is a block/flow diagram illustrating a system/method for security in an automotive security gateway, in accordance with the present principles.

Referring now to FIG. 2, a system/method for security in an automotive security gateway is illustratively depicted in accordance with an embodiment of the present principles.

According to an embodiment of the present invention, the security system 600 can monitor gateway services 610a and network services 620a to identify anomalous service behaviors. Upon identifying an anomalous service behavior of the gateway services 610a and the network services 620a, the security system 600 issues an alarm 690 to address the anomalous behavior. However, the non-anomalous behaviors of the gateway services 610a and the network services 620a can be maintained as verified gateway services 610b and verified network services 620b, respectively.

To verify the gateway services 610a, the security system 600 employs in-gateway security 630. The in-gateway security 630 includes a system scanner 631 and an OS event monitor 640.

The system scanner 631 can be, e.g., a module executed by a processor and stored in a memory or storage that requests status updates from each service within the automotive security gateway. The request can include, e.g., a retrieval of OS event information for a current gateway service 610a, or a retrieval of OS event information from each gateway service 610a of the vehicle as a diagnostic. Thus, the system scanner 631 can retrieve OS event information such as, e.g., a running gateway service 610a of the vehicle and a corresponding process of the gateway service 610a, file of the gateway service 610a and any network events associated with the gateway service 610a, among other event and event related information. The system scanner 631 can operate continuously, collecting all OS event information in real time, or the system scanner 631 can send requests to each gateway services 610a of the vehicle on a periodic basis, such as, e.g., every one second, five second, or ten seconds, or any other interval for sampling the gateway services 610a to minimize a probability of an anomaly being undetected while ensuring computational resources are not compromised.

The OS event monitor 640 can inspect the sampled gateway services 610a to verify the security of corresponding events. Threats in OS events can take the form of attacks using, e.g., programs, files, processes, network events, or other attack vectors. Thus, the OS event monitor 640 inspects each event for such attacks.

However, having knowledge of every possible attack can result in large storage and memory resources being dedicated to maintaining a database of possible attacks because as computing systems, such as, e.g., in-vehicle computing systems, become more sophisticated in operation, connectivity and security, attacks also increase in sophistication and variety. Similarly, analyzing behaviors against every possible attack in the database can be very computationally intensive. Thus, the OS event monitor 640 can identify threats without having information of all possible attacks and attack vectors. Rather, the OS event monitor 640 inspects OS events for behaviors known to be safe and normal to the system. Thus, once an event is identified as not having known safe and normal behaviors, the OS event monitor 640 can flag the event as anomalous and issue an alarm.

The OS event monitor 640 can identify anomalous behavior of events using a learned model. The model can include, e.g., a blueprint modelling system that is trained for normal OS event behaviors such as, e.g., normal network connection requests, normal file access patterns and normal process behaviors, among other behaviors. Thus, the blueprint modelling system learns normal OS events such that when an OS event strays from normal behaviors, the blueprint modelling system can raise an alarm for the behavior being anomalous. Thus, even attacks of unknown origin and unknown type can be identified by the OS event monitor 630 while increasing computational efficiency of the security system 600. The gateway services 610*a* that are not identified as anomalous, and thus normal, safe behaviors, can be passed to corresponding destinations as verified gateway services 610*b*.

To verify the network services 620*a*, the security system 600 employs out-of-gateway security 650. The out-of-gateway security 650 includes a network screen 651 and a network packet monitor 640.

As network traffic enters the automotive security gateway 200, the security system 600 employs the network screen 651 to sample packets of the network traffic. While the network screen 651 can pull each packet from the network traffic on a continuous basis for analysis by the network packet monitor 660, the network screen 651 can alternatively, e.g., sample the network packets on a periodic basis, such as, e.g., once per predetermined period of time, or one of every predetermined number of packets. The predetermined period of time can be set beforehand by a user, or can be automatically determined according to traffic load to balance the computational costs of examining packets with the risk of an attack threat not being found.

Packets selected by the network screen 651 can be analyzed by the network packet monitor 660 to verify safe traffic and generate an alarm for anomalous traffic. As described above, it is difficult and highly resource intensive to include knowledge of every possible attack. Thus, the network packet monitor 660 can determine security threats by identifying behavior that is outside of normal behaviors recognized as safe. For example, unencrypted traffic can be an indication of a possible attack, and thus be considered anomalous as not being encrypted. Similarly, packets originating from and bound for unknown addresses, or signed with either unknown or blacklisted signatures, then the packets can be considered anomalous despite not being confirmed as an actual attack. Similarly, connections and/or connection requests with unknown backend addresses and ports or with segregated subnetworks then the traffic can be considered anomalous. Other possible methods of identifying anomalous network services 620*b* can also be implemented to such that the network packet monitor 660 can identify network traffic that is anomalous. Thus, even network attacks of unknown origin and unknown type can be identified by the network packet monitor 660 while increasing computational efficiency of the security system 600. The network services 620*a* that are not identified as anomalous, and thus normal, safe behaviors, can be passed to corresponding destinations as verified network services 620*b*.

In response to alarms raised by the in-gateway security 630 and the out-of-gateway security 650, a threat mitigation system 670 takes action to mitigate possible attack threats corresponding to the alarms. Thus, the threat mitigation system 670 can inspect the alarm as well as, e.g., the corresponding behavior, and generate a threat mitigation instruction 692 to prevent a threat from spreading. For example, the threat mitigation system 670 can inspect the alarm and a log of the corresponding behavior, and determine, e.g., an origin of an anomalous packet, and in response, issue a threat mitigation instruction 692 disconnecting the origin of the anomalous packet. Other responses to identified threats can be taken commensurate with the type and degree of the threat to prevent corruption to vehicle systems and ensure the safety of vehicle occupants.

Figure 3:
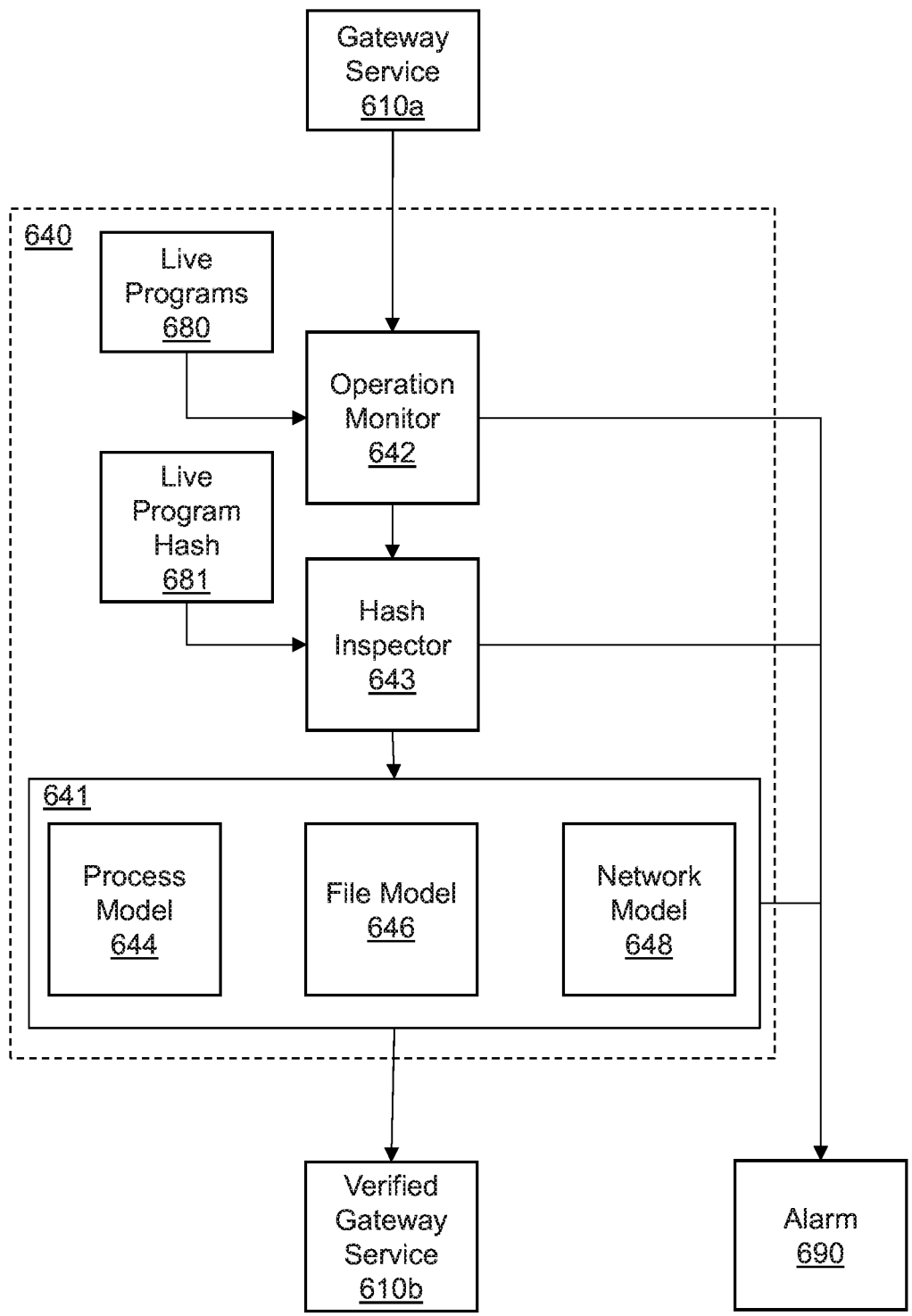
FIG. 3 is a block/flow diagram illustrating a system/method for in-gateway security in an automotive security gateway, in accordance with the present principles.

Referring now to FIG. 3, a system/method for in-gateway security in an automotive security gateway is illustratively depicted in accordance with an embodiment of the present principles.

The OS event monitor 640 can inspect a gateway service 610*a*. Through inspection, the OS event monitor 640 determines whether the gateway service 610*a* can be verified. Where the gateway service 610*a* is verified, the OS event monitor 640 generates a verified gateway service 610*b*. Otherwise, the gateway service 610*a* is exhibiting anomalous behavior, and is thus at risk of attack. If the OS event monitor 640 identifies the gateway service 610*a* as an attack risk, then the OS event monitor 640 generates an alarm 690.

The alarm 690 can include, e.g., diagnostic information of the anomalous behavior so that the attack risk can be addressed. As a result, the alarm 690 can include, e.g., a log of the gateway service 610*a* in, e.g., a temporary or permanent memory, as well as a quarantine of the gateway service 610*a* to prevent a spread of the attack causing the anomalous behavior. The log can include, e.g., information identifying the gateway service, as well as the type of anomalous behavior and any related gateway services 610*a*. Thus, a system, such as, e.g., the threat mitigation system 670 described above, can appropriately address the gateway service 610*a* to mitigate any threats to the vehicle or occupants.

The determination includes inspecting various parts of the gateway service 610*a*, such as, e.g., a program included in the gateway service 610*a* and corresponding, e.g., files, processes, hashes, and network connections, among other event components. The OS event monitor 640 can include different analyses for, e.g., each of a program, a file and a network behavior. As such, the OS event monitor 640 can determine if a gateway service 610*a* includes any one or more of a program, a file or a network connection to analyze the gateway service 610*a* for normal or anomalous behavior.

According to an embodiment of the present invention, the OS event monitor 640 can inspect the program of the gateway service 610*a* to verify functionality. Thus, the OS even monitor 640 includes, e.g., an operation monitor 642 to verify the normal operation of the gateway service 610*a* according to whether a particular function is live. Thus, the operation monitor 642 can compare the program to a set of live programs 680 corresponding to all live gateway services 610*a*. If the program is not included in the set of live programs 680, then the gateway service 610*a* is malfunctioning. Thus, the operation monitor 642 flags the gateway service 610*a* as anomalous by, e.g., logging the gateway service 610*a* as compromised and may include a threat to other gateway services 610*a* or network services. As a result, the operation monitor 642 generates the alarm 690 where the program of the gateway service 610*a* is not one of the live programs 680.

However, even where the program is found to be in the set of live programs 680, and thus the gateway service 610a is verified as operational, the integrity of the gateway service 610a can still have been compromised. A compromise of integrity can be indicated by anomalous changes to hashes of the gateway service 610a program. As a result, the OS event monitor 640 includes a hash inspector 643 to inspect hashes corresponding to each program. Thus, upon inspection of the gateway service 610a and associated program, the hash inspector 643 logs the hash of the gateway service 610a program in, e.g., a temporary or permanent memory. The hash inspector 643 can access the original hashes of each live program 681 to determine an original hash of the program. However, if the hash inspector 643 is unable to verify the hash of the gateway service 610a, then the gateway service 610a is compromised. As a result, the hash inspector 643 generates the alarm 690 to indicate the compromised gateway service 610a and a possible threat to other gateway services 610a and network services.

In addition to verifying the operation and integrity of the gateway service 610a, the OS event monitor 640 can include a system for identifying anomalous behavior exhibited by the gateway service 610a. To do so, the OS event monitor 640 includes a blueprint modelling system 641 to recognize normal behaviors of each gateway service 610a. However, processes, files and network connections each are defined by different behavior patterns. Thus, the blueprint modelling system 641 is trained to recognize behavior patterns of each of processes, files and network connections. Thus, the blueprint modelling system 641 can separately recognize behavior patterns of processes, of files and of network connections to identify abnormal behavior patterns. As a result, the blueprint modelling system 641 includes a process model 644, a file model 646 and a network model 648 to identify anomalous behavior of a gateway service 610a exhibited by a process, a file and/or a network connection, respectively.

One possible indication of an attack is unusual process behavior. Under normal conditions, the program of the gateway service 610a includes a set of process behaviors including spawning other programs. Therefore, identification of unusual spawning can provide an effective and efficient means for identifying a possible attack. As a result, the process model 644 is a learned model to recognize normal process behavior.

Process behavior can include, e.g., programs spawned by running a program, or other suitable behavior indicating normally functioning processes. As a result, the process model 644 is trained to recognize a set of programs that are normally spawned by executing each one of the live programs 680. Accordingly, the gateway service 610a is provided to the process model 644. The process model 644 inspects the processes of the gateway service 610a to identify spawned programs from executing the program of the gateway service 610a. The process model 644 then determines whether the spawned programs can be recognized as normally spawned. Where any one of the spawned programs cannot be recognized as normally spawned, the one of the spawned programs is considered anomalous as spawning abnormal programs. As a result, process model 644 generates the alarm 690 for the gateway service 610a including an alert of the anomalous process behavior of the gateway service 610a. However, where the process model 644 does recognize the spawned programs, the processes of the gateway service 610a are verified.

Another possible indication of an attack on vehicle services is unusual file access patterns. An attack can alter the files or file access patterns of a program of the gateway service 610a. As a result, inspecting the program for unusual file access patterns can be an effective and efficient method of identifying an attack. Thus, the blueprint modelling system 641 also inspects the gateway service 610a for file behavior using a file model 646. The file model 646 is a learned model to recognize normal file access patterns, such as, e.g., opening, closing, reading, writing, among other file behaviors. Similar to the process model 644, the file model 646 is trained against the file access patterns of each possible gateway service 610a. Thus, the file model 646 is trained to recognize normal file access behavior.

To test whether the gateway service 610a exhibits normal file access patterns, the file model 646 tests file access patterns of the gateway service 610a by testing file opening, closing, reading and writing patterns. The file access patterns of the gateway service 610a are compared against the training of the file model 646. Where the file model 646 is unable to recognize the file access patterns as normal, the file model 646 determines that the gateway service 610a exhibits anomalous file behavior. As a result, the file model 646 generates the alarm 690 including an alert of the anomalous file access behavior of the gateway service 610a. However, where the file model 646 does recognize the file access patterns, the file access patterns of the gateway service 610a are verified.

Similarly, network behavior can be analyzed for anomalous behavior. One possible indication of a network-based threat is connection to an unknown or abnormal network. The gateway service 610a connecting to an unusual network can indicate that security has been compromised because the unusual network is not verified as secure. As a result, the unusual network can be an attacking network or a device on the unusual network can be an attacking device. As a result, the blueprint modelling system 641 includes a network model 648 that is trained to recognize normal network connections to limit the risk of attacking devices from gaining access to vehicle services.

The network model 648 inspects network connections initiated by or to the gateway service 610a. The network connections of the gateway service 610a are compared against the training of the network model 648. Where the network model 648 is unable to recognize the network connects as normal, the network model identifies the gateway service 610a as exhibiting anomalous network behavior. As a result, the network model 648 generates the alarm 690 including an alert of the anomalous network behavior of the gateway service 610a. However, where the network model 648 does recognize the network connections, the network connections of the gateway service 610a are verified.

The blueprint modelling system 641 can, therefore, verify the gateway service 610a to generate a verified gateway service 610b by inspecting the gateway service 610a for each of anomalous process behavior, anomalous file access behavior and anomalous network behavior. As a result, the vehicle functionalities within the automotive security gateway are secured and verified using the in-gateway security 640. Thus, attack threats and attack vectors are minimized in an efficient and effective manner.

Figure 4:
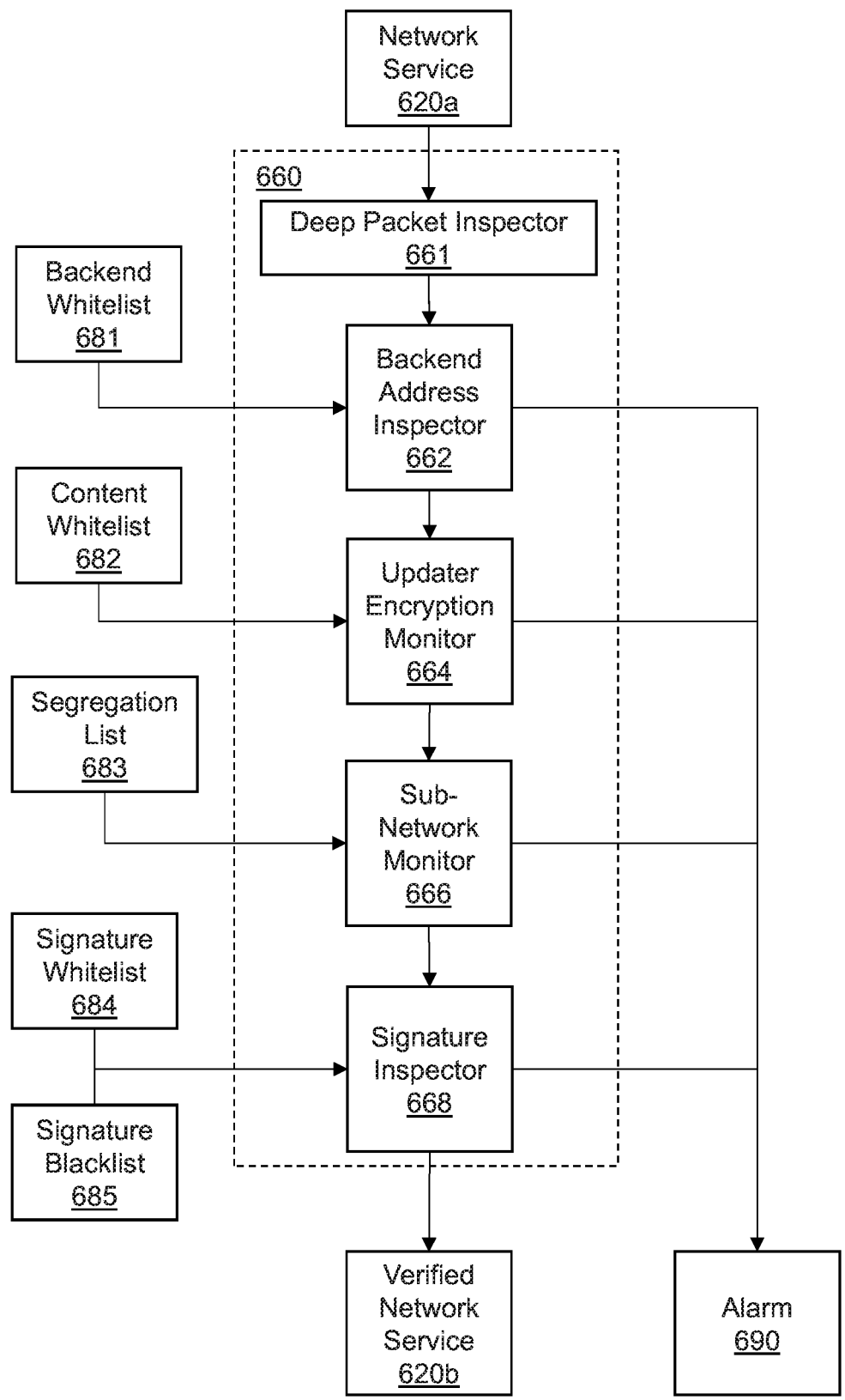
FIG. 4 is a block/flow diagram illustrating a system/method for out-of-gateway security in an automotive security gateway, in accordance with the present principles.

Referring now to FIG. 4, a system/method for out-of-gateway security in an automotive security gateway is illustratively depicted in accordance with an embodiment of the present principles.

According to an embodiment of the present invention, the network packet monitor 600 can monitor network traffic, including, e.g., network services 620a, for anomalous behavior and characteristics. Because out-of-gateway services, including network services 620a originating outside of the automotive security gateway, are outside of the control of the automotive security gateway, network connections can provide a vector for attack from known and unknown malicious devices and networks. However, having knowledge of every attack possible by an out-of-gateway service is a very storage and computationally intensive task. However, knowledge of safe services, and associated behaviors and origins, is relative space and computationally efficient. Thus, to effectively ensure that only safe network packets of the network traffic are allowed, the network packet monitor 600 uses characteristics and attributes of the packets known to indicate secure network traffic as criteria for verifying the network traffic. As a result, the network packet monitor 600 includes a deep packet inspector 661 to extract the packet characteristics and attributes. Such characteristics and attributes can include, e.g., backend service address and ports, signatures, sub-network connections, among other packet characteristics.

As a result, upon detection by, e.g., the network screen 651 described above, a network service 620a is inspected by a backend address inspector 662. The backend address inspector 662 can ensure that the packet provided by the network service 620a is from a trusted source to bound for a trusted destination. Therefore, the source and destination of network traffic can be verified, reducing the risk of unknown sources and destinations as vectors for attack.

Thus, the backend address inspector 662 leverages a set of known safe address and port combinations of trusted backend services. The set can be included in a backend whitelist 681 provided to the backend address inspector 662. By comparing the backend service address and ports of the network service 620a with the backend whitelist 681, the backend address inspector 662 can determine whether the network service 620a is normal or anomalous. Alternatively, a behavior model similar to the blueprint modelling system described above can be used, where the behavior model is a backend service model that has been trained for normal backend services and associated addresses and ports. The backend address inspector 662 can generate the alarm 690 upon an identification of an anomalous backend service address or port. However, an identification of the network service 620a as communicating with a normal backend service address and port causes the backend address inspector 662 to verify the backend service of the network service 620a. As a result, the automotive security gateway are secured from network services 620a using the in-backend address inspector 662. Thus, attack threats and attack vectors are minimized in an efficient and effective manner.

The network service 620a can also be provided to an updater encryption monitor 664. The updater encryption monitor 664 determines whether the packets of the network service 620a correspond to an updater service. To do this, the updater encryption monitor 664 can utilize deep packet inspection to identify a traffic header of the network service 620a and characterize the packet of the network service 620a. The characterization of packets of the network service 620a can form a description of a type of content being communicated by the network service 620a corresponding to the traffic header. Some content types can be associated with updater services. Thus, the results of the deep packet inspection can be compared with the types of content included in a content whitelist 682. The content whitelist 682 includes information regarding safe and normal updater services. Thus, the update encryption monitor 664 can identify normal network services 620a as updater services.

Packets provided by an updater service to the vehicle systems have the potential to affect files and settings for vehicle functions due to the high level of access provided for system updates. Thus, an attack through the updater service can comprise vehicle systems by, e.g., installing backdoors, installing viruses, controlling vehicle functions, locking out occupants, disabling or enabling improper functions at improper times, among other threats. Thus, encryption of network service 620a packets from an updater service is an effective and efficient way of preventing such attacks by closing the vector of attack from external influence. Therefore, the updater encryption monitor 664 examines the packets of the network service 620a to determine whether encryption is used on the network service 620a. Encryption can be identified by, e.g., deep packet inspection, meta-data inspection, attempting to decode a packet, or other technique of identifying encryption. Thus, the network service 620a can be identified as having encryption on an updater service or not. The updater encryption monitor 664 then generates an alarm 690 for network services 620a that correspond to an updater service but is not encrypted. In contrast, the updater encryption monitor 664 can verify the encryption of an updater service corresponding to the network service 620a. Thus, attack threats and attack vectors using an updater service are minimized in an efficient and effective manner.

Even where the backend service of the packets included in the network service 620a is a verified backend service, the backend service may still be insecure, thus providing an attack vector for malicious activity. As vehicles become more connect, for example, to the internet or to other devices via, e.g., a hotspot network. Such connections can be susceptible to attack. Connections, such as Wi-Fi hotspots can be accessed by other devices, thus increasing the risk of attack. Accordingly, Wi-Fi hotspots and other similar networks that can include connections to other unknown devices, can be segregated from each other to limit exposure to possible attacks.

As a result, a sub-network monitor 666 is included in the network packet monitor 660 to verify that sub-networks such as Wi-Fi hotspots are segregated from each other and from in-car networks. Accordingly, the sub-network monitor 666 inspects the packets of the network service 620a to determine whether the network service 620a communicates with a network that should be segregated. To do so, the sub-network monitor 666 extracts the destination address and the source address from each packet. The sub-network monitor 666 can then compare the destination address and source address to addresses associated with each network identified as a segregation network in a segregation list 683. Each network in the segregation list 683 has been identified as a sub-network that is to be segregated to prevent exposure to attacks from external devices. Thus, if either the source address or the destination address of the packet matches an address of a segregated sub-network, the segregated sub-network is in communication with an in-gateway network by the network service 620a, contrary to the identification as segregated. As a result, the network service 620a is identified as insecure and the alarm 690 is generated.

The backend address inspector 662, the updater encryption monitor 664 and the sub-network monitor 666 ensure that the network service 620a is communicating with a safe backend service. However, even where the backend service is trusted and the network service 620a is encrypted, the network service 620a can still be used as an attack vector with, e.g., trojan horse attacks, or other attacks that are passed along a trusted backend service. As a result, a signature inspector 668 inspects the contents of packets to determine whether the packets are signed with trusted or malicious signatures to verify the contents of the packets as safe.

The signature inspector 668 can include information regarding secure and malicious content signatures from a signature whitelist 684 and a signature blacklist 685, respectively. The signature whitelist 684 can include, e.g., a list of secure signatures formed from, e.g., a content model that is trained updated according to content patterns during normal use. Thus, as content is provided by packets of the network service 620*a*, when the content is found to be secure or insecure, the content model is updated to reflect the secure or insecure content pattern. Thus, the signature whitelist 684 is built to include signatures associated with secure content patterns.

The signature blacklist 685, however, can be built from, e.g., a pre-determined list of signatures associated with malicious activity. The signature blacklist 685 can be pre-determined by, e.g., an intelligence service that researches and identifies malicious activity, or by other suitable sources of known malicious content.

A context signature is built from the signature whitelist 684 and the signature blacklist 685. The context signature includes an entry for the list of signatures in the signature whitelist 684, and an entry for the list of signatures in the signature blacklist 685. The context signature can be, e.g., indexed by a network five tuple (source IP address, source port, destination IP address, destination port, and protocol).

The signature inspector 668 can inspect the packets and extract signatures from each pack of the network service 620*a*. The signature identifies the content of the packet. The five tuple (source IP address, source port, destination IP address, destination port, and protocol) is used as a key to find a corresponding context signature. Then, to verify the packet, the signature of the packet is generated and compared against the signature whitelist 684 and against the signature blacklist 685. When the signature matches a whitelisted signature, the content and the packet of the network service 620*a* is verified. However, if the signature matches a blacklisted signature, then the signature inspector 668 generates the alarm 690.

If an alarm 690 is generated by any component of the network packet monitor 660, then the offending packet and corresponding network service 620*a* is flagged as a potential threat. The alarm 690 can include, e.g., identifying information of the network service 620*a*, as well as information regarding the component responsible for generating the alarm 690. Thus, the network service 620*a* is identified as an attack threat with information regarding the nature of the threat. Accordingly, the network packet monitor 660 can identify and address potential attack vectors including the network service 620*a* quickly and efficiently by employing knowledge of normal and trusted network behaviors.

However, if the network service 620*a* is inspected by each component of the network packet monitor 660 and is verified by each component, then the network service 620*a* is output as a verified network service 620*b*. The verified network service can, therefore, by passed on to the intended destination.

Figure 5:
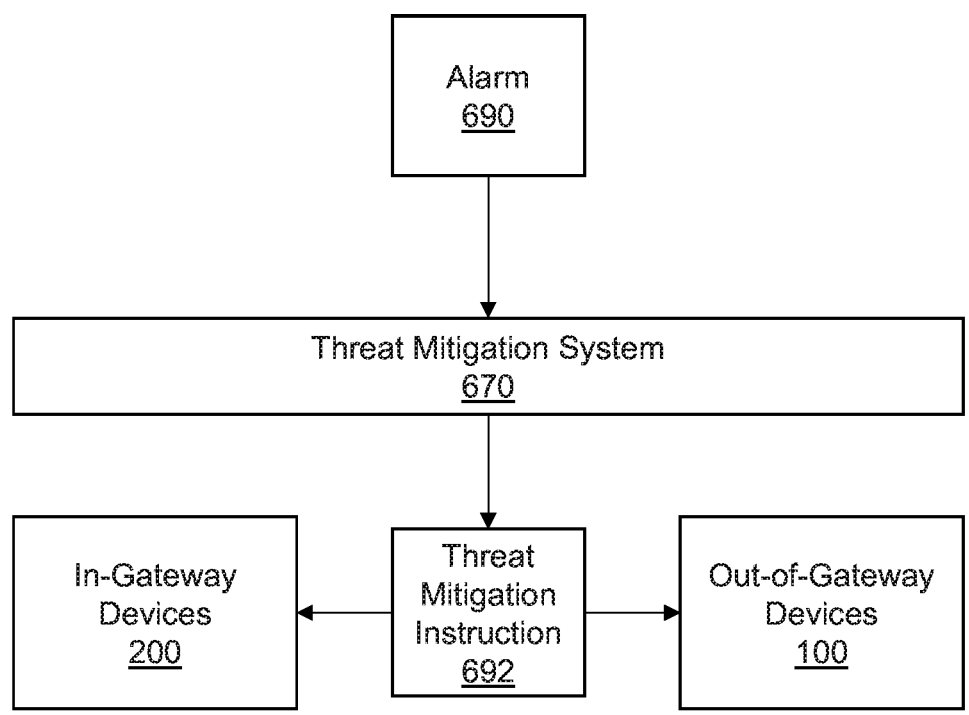
FIG. 5 is a block/flow diagram illustrating a system/method for generating alerts in response to risks identified by an automotive security gateway, in accordance with the present principles.

Referring now to FIG. 5, a system/method for generating alerts in response to risks identified by an automotive security gateway is illustratively depicted in accordance with an embodiment of the present principles.

In response to alarms raised by the security system 600, a threat mitigation system 670 takes action to mitigate possible attack threats corresponding to the alarms. As described above, an alarm 690 can include, e.g., information concerning the service that is the subject of the alarm 690, the behavior that triggered the alarm, as well as other information, such as, e.g., a time stamp, network addresses associated with the service, other services that are immediately affected by the service, and any other diagnostic information.

Thus, the threat mitigation system 670 can inspect the alarm as well as, e.g., the corresponding behavior, and generate a threat mitigation instruction 692 to prevent a threat from spreading. For example, the threat mitigation system 670 can inspect the alarm and a log of the corresponding behavior, and determine, e.g., an origin of an anomalous packet, and in response, issue a threat mitigation instruction 692 disconnecting the origin of the anomalous packet. Other responses to identified threats can be taken commensurate with the type and degree of the threat to prevent corruption to vehicle systems and ensure the safety of vehicle occupants.

The threat mitigation instruction 692 can be provided to appropriate in-gateway devices 200 and out-of-gateways devices 100, such as the devices described above with regards to FIG. 1. The threat mitigation instruction 692 can be directed to a particular device by the threat mitigation system 670 according to, e.g., the type of service that is the subject of the alarm 690. For example, the threat mitigation system 670 can analyze the type of service and identify a device associated with such a type of service, such as, e.g., associating a vehicle ECU with an anti-lock braking service.

As a result, the threat mitigation system 670 can communicate to an appropriate device to prevent harmful effects of a possible attack via the service that is the subject of the alarm 690. For example, for an anomalous infotainment software update service, the threat mitigation system 670 can communicate with the infotainment system of the in-gateway devices 200 to discard or quarantine services originating from the address associated with the anomalous infotainment software update service. As another example, for an anomalous ECU service, such as, e.g., anti-lock braking that has raised an alarm 690 via the signature inspector described above, the anti-lock braking service may be from a blacklisted signature, thus indicating malicious software masquerading as ECU services. Thus, the threat mitigation system 670 can communicate a threat mitigation instruction 692 to the ECU to disregard the masquerading anti-lock braking service to ensure safe and effective braking of the vehicle.

According to aspects of the present invention, the threat mitigation instruction 692 can include an instruction to use a prior verified service of the type of the anomalous service. Thus, for the anomalous braking service, the threat mitigation system 670 can issue the threat mitigation instruction 692 to provide a previously verified anti-lock braking service, thus ensuring safe actuation of the vehicle brakes. Similar instruction can be provided to each system of the vehicle, including, e.g., the infotainment system, in-vehicle networks, hotspot network, update systems, among others. Thus, the safe and secure operation of the vehicle is enhanced by ensuring secure control of vehicle systems via the automotive security gateway.

Figure 6:
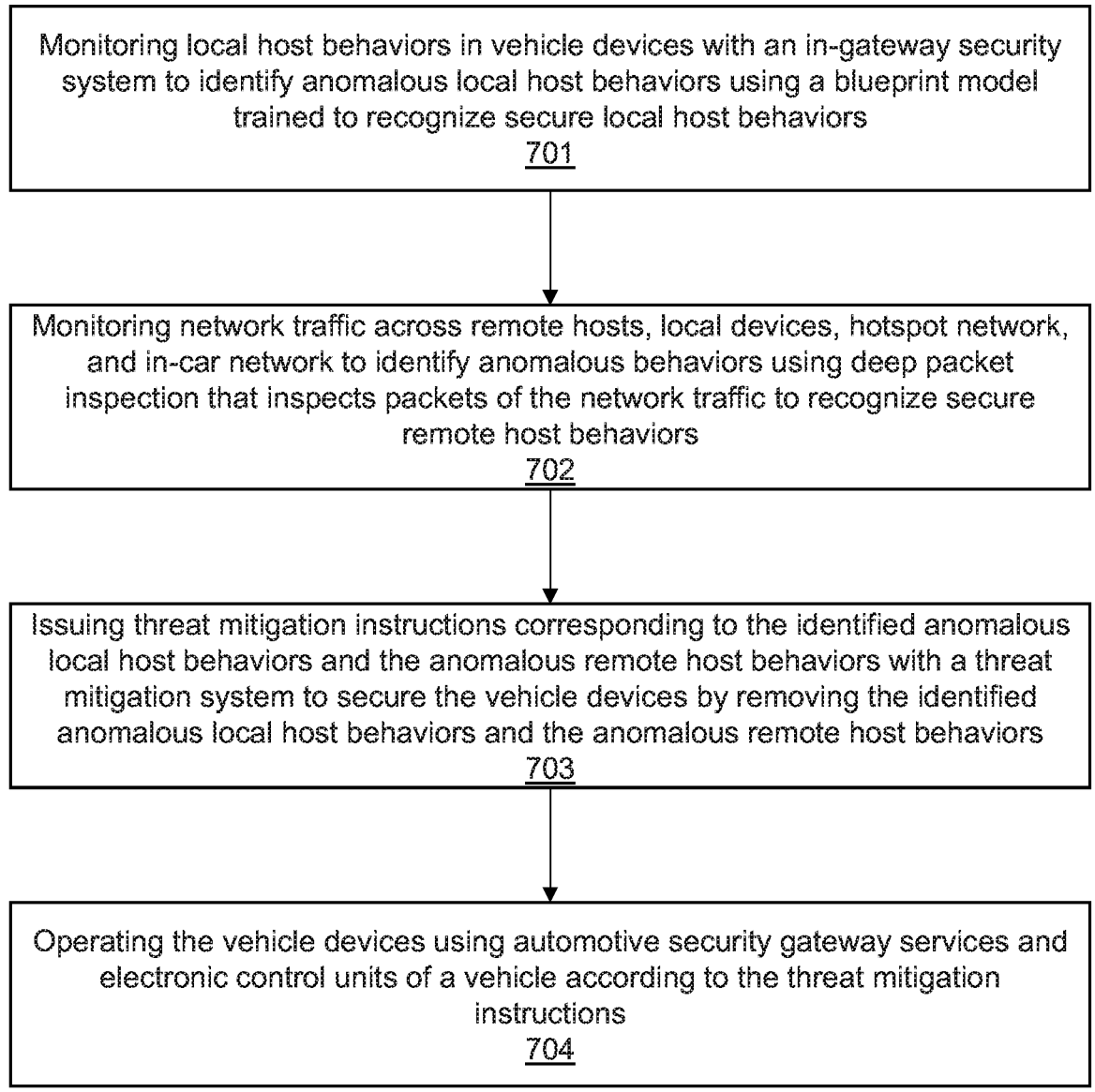
FIG. 6 is a flow diagram illustrating a system/method for host behavior and network analytics in an automotive security gateway, in accordance with the present principles.

Referring now to FIG. 6, a system/method for host behavior and network analytics in an automotive security gateway is illustratively depicted in accordance with an embodiment of the present principles.

At block 701, local host behaviors are monitored in vehicle devices with an in-gateway security system to identify anomalous local host behaviors using a blueprint model trained to recognize secure local host behaviors.

At block 702, network traffic across remote hosts, local devices, hotspot network, in-car network are monitored to identify anomalous behaviors using deep packet inspection that inspects packets of the network traffic to recognize secure remote host behaviors.

At block 703, threat mitigation instructions corresponding to the identified anomalous local host behaviors and the anomalous remote host behaviors are issued with a threat mitigation system to secure the vehicle devices by removing the identified anomalous local host behaviors and the anomalous remote host behaviors.

At block 704, the vehicle devices are operated using automotive security gateway services and electronic control units of a vehicle according to the threat mitigation instructions.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for an automotive security gateway, the system comprising:
    an in-gateway security system that monitors local host behaviors in vehicle devices to identify anomalous local host behaviors using a blueprint model trained, using a blueprint modelling system, to recognize secure local host behaviors, the blueprint modelling system comprising:
        a process modelling component trained to recognize normal process behaviors including programs normally spawned from a program of each of the in-gateway services such that the process modelling component identifies anomalous process behaviors that are not normal based on an identification of programs being unusually spawned from the program, the process modeling component being configured for generating an alarm including an alert for detected anomalous local host behavior; and
        a file modelling component trained to recognize normal file access behaviors of the program of each of the in-gateway services such that the file modelling component identifies anomalous file access behaviors that are not normal based on a file model trained against file access patterns of each possible gateway service, the file modeling component being configured for generating an alarm including an alert for detected anomalous local host behavior, wherein the in-gateway security system includes a system scanner that scans each of the vehicle devices to identify in-gateway services;
    an out-of-gateway security system that monitors network traffic across remote hosts, local devices, hotspot network, and in-car network to identify anomalous behaviors using deep packet inspection that inspects packets of the network traffic;
    a threat mitigation system to issue threat mitigation instructions corresponding to the identified anomalous local host behaviors and the anomalous remote host behaviors to secure the vehicle devices by removing the identified anomalous local host behaviors and the anomalous remote host behaviors; and
    automotive security gateway services and vehicle electronic control units operating the vehicle devices according to the threat mitigation instructions.

2. The system as recited in claim 1, wherein the blueprint modelling system further comprises:
    a network modelling component trained to recognize normal network connection behaviors for the program of each of the in-gateway services such that the network modelling component identifies anomalous network connection behaviors that are not normal to generate the alarm for anomalous behavior.

3. The system as recited in claim 2, wherein file events of the normal file access behaviors and the anomalous file access behaviors includes file reading, file writing, file opening and file closing.

4. The system as recited in claim 2, wherein network events of the normal network connection behaviors and the anomalous network connection behaviors includes source address, source port, destination address, destination port and protocol.

5. The system as recited in claim 1, wherein the out-of-gateway security system includes a network screen that scans the network traffic to identify out-of-gateway services.

6. The system as recited in claim 1, wherein the out-of-gateway security system includes a backend address inspector that compares a packet source address and a packet destination address to a backend whitelist of backend addresses to identify unverified backend hosts corresponding to anomalous network traffic and generate a network traffic alarm.

7. The system as recited in claim 1, wherein the out-of-gateway security system includes an updater encryption monitor that uses deep packet inspection to compare a packet destination address to a content whitelist of updater addresses to identify unverified updater hosts and to identify an encryption status of the packet corresponding to anomalous network traffic and generate a network traffic alarm.

8. The system as recited in claim 1, wherein the out-of-gateway security system includes a sub-network monitor that compares a packet source address and a packet destination address to a segregation list of sub-networks to be segregated to identify network traffic in communication with one of the sub-networks to be segregated and generate a network traffic alarm.

9. The system as recited in claim 1, wherein the out-of-gateway security system includes a signature inspector configured to:
    match a key generated from the network five tuple, source internet protocol address (IP), source port, destination IP, destination port, and a protocol, to a key of a context signature, the context signature including a key, a list of a signature whitelist and a list of a signature blacklist;
    match a signature from a packet to a signature from one of the signature whitelist or the signature blacklist upon matching the signature for the key, the second packet being subsequent to the first packet; and generate a network traffic alarm where the signature of the second packet matches a signature of the signature blacklist to inspect signatures of the network traffic.

10. A system for an automotive security gateway, the system comprising:
an in-gateway security system that monitors local host behaviors in vehicle devices to identify anomalous local host behaviors, the in-gateway security system including:
a system scanner that scans each of the vehicle devices to identify in-gateway services; and
a blueprint modelling system trained to recognize secure local host behaviors, the blueprint modelling system comprising:
a process modelling component trained to recognize normal process behaviors including programs normally spawned from a program of each of the in-gateway services such that the process modelling component identifies anomalous process behaviors that are not normal based on an identification of programs being unusually spawned from the program, the process modeling component being configured for generating an alarm including an alert for detected anomalous local host behavior; and
a file modelling component trained to recognize normal file access behaviors of the program of each of the in-gateway services such that the file modelling component identifies anomalous file access behaviors that are not normal based on a file model trained against file access patterns of each possible gateway service, the file modeling component being configured for generating an alarm including an alert for detected anomalous local host behavior, wherein the in-gateway security system includes a system scanner that scans each of the vehicle devices to identify in-gateway services;
an out-of-gateway security system that monitors network traffic across remote hosts,
local devices, hotspot network, in-car network to identify anomalous behaviors, the out-of-gateway security system including:
a network screen that scans the network traffic to identify out-of-gateway services; and
a deep packet inspector that performs deep packet inspection to inspect packets of the network traffic to identify packet attributes including a packet source address and a packet destination address;
a threat mitigation system to issue threat mitigation instructions corresponding to the identified anomalous local host behaviors and the anomalous remote host behaviors to secure the vehicle devices by removing the identified anomalous local host behaviors and the anomalous remote host behaviors; and
automotive security gateway services and vehicle electronic control units operating the vehicle devices according to the threat mitigation instructions.

11. The system as recited in claim 10, wherein the blueprint modelling system further comprises:
a network modelling component trained to recognize normal network connection behaviors for the program of each of the in-gateway services such that the network modelling component identifies anomalous network connection behaviors that are not normal to generate the alarm for anomalous behavior.

12. The system as recited in claim 10, wherein the out-of-gateway security system includes a backend address inspector that compares the packet source address and the packet destination address to a backend whitelist of backend addresses to identify unverified backend hosts corresponding to anomalous network traffic and generate a network traffic alarm.

13. The system as recited in claim 10, wherein the out-of-gateway security system includes an updater encryption monitor that uses the deep packet inspection to compare the packet source address and the packet destination address to a content whitelist of updater addresses to identify unverified updater hosts and to identify an encryption status of the packet corresponding to anomalous network traffic and generate a network traffic alarm.

14. The system as recited in claim 10, wherein the out-of-gateway security system includes a sub-network monitor that compares the packet source address and the packet destination address to a segregation list of sub-networks to be segregated to identify network traffic in communication with one of the sub-networks to be segregated and generate a network traffic alarm.

15. The system as recited in claim 10, wherein the out-of-gateway security system includes a signature inspector configured to:
match a key generated from the network five tuple, source internet protocol address (IP), source port, destination IP, destination port, a protocol, to a key of a context signature, the context signature including a key, a list of a signature whitelist and a list of a signature blacklist;
match a signature from a packet to a signature from one of the signature whitelist or the signature blacklist upon matching the signature of the first packet with the key, the second packet being subsequent to the first packet; and
generate a network traffic alarm where the signature of the packet matches a signature of the signature blacklist to inspect signatures of the network traffic.

16. A method for securing an automotive security gateway, the method comprising:
monitoring local host behaviors in vehicle devices with an in-gateway security system to identify anomalous local host behaviors using a blueprint model trained, using a blueprint modelling system, to recognize secure local host behaviors, the blueprint modelling system comprising:
training, by process modelling, to recognize normal process behaviors including programs normally spawned from a program of each of the in-gateway services such that identifying, by the process modelling anomalous process behaviors that are not normal based on an identification of programs being unusually spawned from the program, generating, by the process modeling, an alarm including an alert for detected anomalous local host behavior; and
recognizing, by file modelling, after being trained, to recognize normal file access behaviors of the program of each of the in-gateway services such that identifying, by the file modelling, anomalous file access behaviors that are not normal based on a file model trained against file access patterns of each possible gateway service, generating, by the file modeling, an alarm including an alert for detected anomalous local host behavior, wherein the in-gateway security system includes a system scanner that scans each of the vehicle devices to identify in-gateway services;

monitoring network traffic across remote hosts, local devices, hotspot network, and in-car network to identify anomalous behaviors using deep packet inspection to inspect packets of the network traffic;

issuing threat mitigation instructions corresponding to the identified anomalous local host behaviors and the anomalous remote host behaviors with a threat mitigation system to secure the vehicle devices by removing the identified anomalous local host behaviors and the anomalous remote host behaviors; and operating the vehicle devices using automotive security gateway services and electronic control units of a vehicle according to the threat mitigation instructions.

17. The method as recited in claim 15, wherein the monitoring local host behaviors includes:

identifying anomalous network connection behaviors that are not normal using a network modelling component trained to recognize normal network connection behaviors for the program of each of the in-gateway services to generate the alarm for anomalous behavior.

18. The method as recited in claim 15, wherein monitoring the network traffic includes:

performing deep packet inspection to identify a source address of a packet of the network traffic and a destination address of the packet of the network traffic;

comparing the source address of the packet and the destination address of the packet to verified backend addresses and networks; and generating a network traffic alarm where one of the source address of the packet or the destination address of the packet is not one of the verified backend addresses and networks.

19. The method as recited in claim 15, wherein monitoring the network traffic includes:

matching a key generated from the network five tuple, source internet protocol address (IP), source port, destination IP, destination port, a protocol, to a key of a context signature, the context signature including a key, a list of a signature whitelist and a list of a signature blacklist;

matching a signature of a packet to a signature from one of the signature whitelist or the signature blacklist upon matching the signature of the first packet with the key, the second packet being subsequent to the first packet; and generating a network traffic alarm where the signature of the second packet matches a signature of the signature blacklist.

* * * * *